(12) United States Patent
Fletcher et al.

(10) Patent No.: US 11,329,807 B2
(45) Date of Patent: May 10, 2022

(54) CONTROLLED CRYPTOGRAPHIC PRIVATE KEY RELEASE

(71) Applicant: nChain Licensing AG, Zug (CH)

(72) Inventors: John Fletcher, Cambridge (GB); Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 57 days.

(21) Appl. No.: 16/626,294

(22) PCT Filed: Jun. 22, 2018

(86) PCT No.: PCT/IB2018/054625
§ 371 (c)(1),
(2) Date: Dec. 23, 2019

(87) PCT Pub. No.: WO2019/003071
PCT Pub. Date: Jan. 3, 2019

(65) Prior Publication Data
US 2020/0162243 A1    May 21, 2020

(30) Foreign Application Priority Data

Jun. 26, 2017 (GB) ...................................... 1710176

(51) Int. Cl.
*H04L 9/08*   (2006.01)
*H04L 9/30*   (2006.01)
*H04L 9/32*   (2006.01)

(52) U.S. Cl.
CPC ............. *H04L 9/085* (2013.01); *H04L 9/30* (2013.01); *H04L 9/3213* (2013.01); *H04L 9/3247* (2013.01)

(58) Field of Classification Search
CPC ....... H04L 9/3236; H04L 9/30; H04L 9/3297; H04L 9/085; H04L 9/3213; H04L 9/3247; H04L 2209/38
See application file for complete search history.

(56) References Cited

U.S. PATENT DOCUMENTS 9,411,982 B1   8/2016  Dippenaar et al.
9,774,578 B1   9/2017  Ateniese et al.
(Continued)

FOREIGN PATENT DOCUMENTS

EP   2865129 A1   4/2015
GB   2538022 A    11/2016
(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Mohammad A Siddiqi
(74) *Attorney, Agent, or Firm* — Davis Wright Tremaine LLP

(57) ABSTRACT

A computer-implemented method includes: storing an encryption public key that is associated with a group of nodes, each node in the group associated with a private key share, the private key shares associated with a threshold private key reconstruction scheme for the group to allow an encryption private key associated with the encryption public key to be determined from at least a threshold of the private key shares; iteratively obtaining a plurality of indicators provided by a plurality of nodes of the group, each of the indicators representing one of an encryption private key share or a dummy signal; and identifying the encryption private key by iteratively: i) selecting a subset of the indicators; ii) calculating a possible shared secret; and iii) evaluating each possible shared secret against the encryption public key to determine whether the possible shared secret is the encryption private key. The invention is suited for implementation on a blockchain.

14 Claims, 6 Drawing Sheets

(56) References Cited

U.S. PATENT DOCUMENTS

| | | | |
|---|---|---|---|
| 2008/0089519 | A1 | 4/2008 | Ekberg |
| 2008/0205637 | A1 | 8/2008 | Kurihara et al. |
| 2010/0215172 | A1* | 8/2010 | Schneider ............... H04L 9/085 380/28 |
| 2012/0110327 | A1 | 5/2012 | Doerner et al. |
| 2012/0151205 | A1 | 6/2012 | Raykova et al. |
| 2013/0046983 | A1 | 2/2013 | Zhu et al. |
| 2013/0191632 | A1* | 7/2013 | Spector ................. H04L 9/0847 713/155 |
| 2015/0378842 | A1 | 12/2015 | Tomlinson et al. |
| 2016/0085955 | A1* | 3/2016 | Lerner .................. G06F 21/725 726/20 |
| 2016/0086175 | A1* | 3/2016 | Finlow-Bates ..... H04W 12/068 705/77 |
| 2017/0048209 | A1* | 2/2017 | Lohe .................... G06Q 20/384 |
| 2017/0250816 | A1* | 8/2017 | Popa ....................... G06F 21/12 |
| 2017/0264430 | A1 | 9/2017 | Robertson |
| 2018/0004930 | A1* | 1/2018 | Csinger ................. H04L 9/3234 |
| 2019/0347433 | A1* | 11/2019 | Chakravorty ............. H04L 9/30 |
| 2020/0202038 | A1* | 6/2020 | Zhang .................... G16H 50/30 |

FOREIGN PATENT DOCUMENTS

| | | |
|---|---|---|
| JP | 2010-166432 A | 7/2010 |
| WO | 2016049406 A1 | 3/2016 |
| WO | 2017090041 A1 | 6/2017 |
| WO | 2017151861 A1 | 9/2017 |

OTHER PUBLICATIONS

Damgard et al., "Secure Key Management in the Cloud," retrieved from https://eprint.iacr.org/2013/629.pdf, 2013, 34 pages.

Fu et al., "Active Traffic Analysis Attacks and Countermeasures," International Conference on Computer Networks and Mobile Computing, 2003, 9 pages.

Gennaro et al., "Threshold-Optimal DSA/ECDSA Signatures and an Application to Bitcoin Wallet Security," retrieved from https://eprint.iacr.org/2016/013.pdf, 2016, 42 pages.

International Search Report and Written Opinion for Application No. PCT/IB2018/054625, dated Sep. 6, 2018, filed Jun. 22, 2018, 11 pages.

Libert et al., "Adaptively Secure Non-Interactive Threshold Cryptosystems," Theoretical Computer Science, 478, 2013, pp. 76-100.

Noack et al., "Dynamic Threshold Cryptosystem Without Group Manager," retrieved from https://eprint.iacr.org/2008/380.pdf, 2008, 17 pages.

Rees et al., "An Application of Covering Designs: Determining the Maximum Consistent Set of Shares in a Threshold Scheme," retrieved from http://www.cs.umanitoba.ca/~vanrees/wei.pdf, 1999, 14 pages.

Satoshi et al., "Connection Limits," Bitcoin Forum, Aug. 9, 2010, https://bitcointalk.org/index.php?topic=741.0;prev_next=prev, 2 pages.

Shamir, "How to Share a Secret," Massachusetts Institute of Technology, 22(11): Nov. 1979, 2 pages.

Tso et al., "A Share-Correctable Protocol for the Shamir Threshold Scheme and Its Application to Participant Enrollment," retrieved from https://eprint.iacr.org/2005/239.pdf, 2005, 12 pages.

* cited by examiner

CONTROLLED CRYPTOGRAPHIC PRIVATE KEY RELEASE

This invention relates generally to data security and cryptographic techniques, and more particularly to methods and systems for the controlled release of a private key associated with a public key used to lock data or a token. The invention is particularly suited to, but not limited to, securing data to allow such data to be unlocked (for access and/or transfer) only after occurrence of an event.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof records of events, distributed processing etc.) while being more versatile in their applications.

Thus, there is a need for improved techniques for providing additional processes and features through blockchain technologies.

The present invention is defined in the appended claims.

Thus, in accordance with the present invention there is provided a method as defined in the appended claims.

As will be described in greater detail below, a requester node may issue a monitoring request to request that a plurality of other nodes form a group. The monitoring request may be a request for nodes to form a group and monitor for an event. The nodes of the group may be configured to cooperate with one another to execute a dealer-free secret sharing protocol twice to generate two shared secrets—an encryption private key and a group-stake private key. The nodes may hold private key shares associated with these private keys and the private key shares may be obtained in accordance with a threshold scheme in which a full private key can be reconstructed from at least a threshold of associated private key shares. Nodes of the group may cooperate with one another to generate and provide an encryption public key to another node, such as the requester node. The nodes of the group may then monitor for an event and, when the event is detected, release their private key share that is associated with the encryption private key. The event may be a predetermined or specified event.

Advantageously, a node having the encryption public key may add an "event lock" to data or a token to restrict access or control over such data or tokens until an event has occurred. Techniques described herein may, therefore, be used to secure data or tokens such as network resources or other digital assets/resources, so that such data or tokens may only be unlocked when an event has occurred. By way of example, data that is encrypted with the encryption public key may be decrypted only after an event has occurred since the encryption private key may only be obtained after a threshold of associated private key shares have been released when an event is detected. Such security techniques may be used, for example only, in estate planning (e.g., so that the contents of a will can only be determined after a testator is deceased), for commercial security, or for publishing embargoes and "dead man switches" on sensitive information. It will be understood that such data security techniques may be useful for other applications apart from those recited herein.

Therefore, in accordance with the invention there may be provided a computer-implemented method. The computer-implemented method may include: storing an encryption public key that is associated with a group of nodes, each node in the group associated with a private key share, the private key shares associated with a threshold private key reconstruction scheme for the group to allow an encryption private key associated with the encryption public key to be determined from at least a threshold of the private key shares; iteratively obtaining a plurality of indicators provided by a plurality of nodes of the group, each of the indicators representing one of an encryption private key share or a dummy signal; and identifying the encryption private key by iteratively: i) selecting a subset of the indicators; ii) calculating a possible shared secret; and iii) evaluating each possible shared secret against the encryption public key to determine whether the possible shared secret is the encryption private key.

In some implementations, the computer-implemented method may include, when the possible shared secret is determined to be the encryption private key, decrypting data previously encrypted with the encryption public key.

In some implementations, the computer-implemented method may include, when the possible shared secret is determined to be the encryption private key: generating a signature based on the encryption private key; and adding the signature to an unlocking script of a transaction to unlock a token previously encumbered with the encryption public key.

In some implementations, the computer-implemented method may include: identifying nodes of the group that provided an indicator representing an encryption private key share in a defined window of opportunity; and cooperatively generating a valid signature for a transaction to transfer one or more digital assets to one or more of the identified nodes. In some implementations, cooperatively generating a valid signature for a transaction to transfer one or more digital assets to one or more of the identified nodes may comprise cooperatively generating a valid signature to distribute one or more tokens provided by a requestor that issued a monitoring request associated with an event.

In some implementations, the computer-implemented method may include: generating one of the encryption private key shares; iteratively providing an indicator to a plurality of nodes of the group, the indicator comprising: when a predetermined event has not occurred, a dummy signal; and in response to detecting the predetermined event, the encryption private key share. In some implementations, the dummy signal may be of the same length as the private key share. In some implementations, the computer-implemented method includes randomly generating the dummy signal.

In some implementations, the computer-implemented method may include: generating a group-stake private key share and, in cooperation with other nodes of the group, generating a group-stake public key, the group-stake private key share allowing a subset of nodes of the group controlling at least a threshold of group-stake private key shares to generate a valid signature on behalf of the group; and encumbering a token using the group-stake public key. In some implementations, the indicator provided to the plurality of nodes of the group includes a signature generated with the group-stake private key.

In some implementations, the computer-implemented method may include: detecting a monitoring request; and in response to detecting the monitoring request, transmitting a request to join the group and establishing secure a communication channel with other nodes of the group.

In some implementations, the group-stake private key share is generated by executing a dealer-free secret sharing protocol with a threshold for a threshold signature scheme. The threshold may be defined in a monitoring request.

In some implementations, the computer-implemented method may include: determining that one of the nodes of the group has breached a protocol by providing an associated private key share in a plurality of indicators; and in response to determining that one of the nodes of the group has breached the protocol, cooperating with other nodes of the group to confiscate a stake of that one of the nodes of the group.

In accordance with the invention, there may be provided an electronic device. The electronic device may include an interface device, a processor coupled to the interface device and a memory coupled to the processor. The memory may have stored thereon computer executable instructions which, when executed, configure the processor to perform a method described herein.

In accordance with the invention, there may be provided a computer readable storage medium. The computer readable storage medium may include computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which.

Blockchain Network

Figure 1:
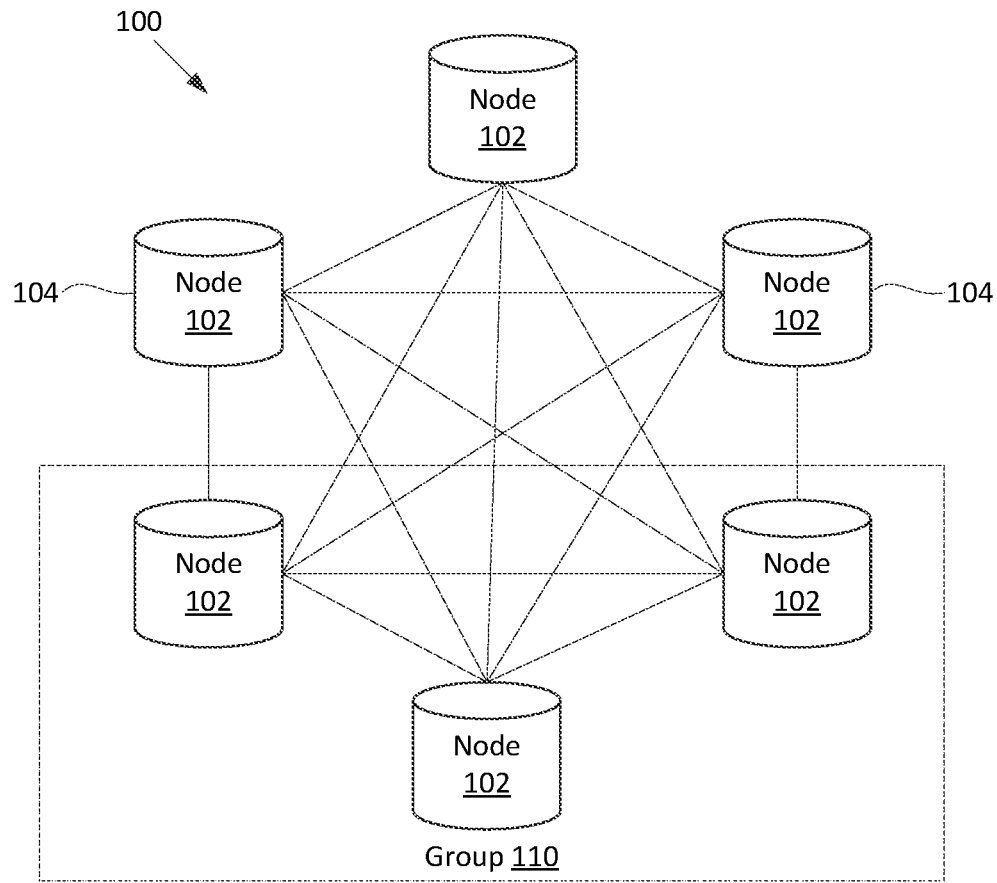
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain network. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 may be a proof-of-work blockchain in which miners 104 perform expensive computations in order to facilitate transactions on the blockchain. For example, the proof-of-work blockchain may require miners to solve a cryptographic problem. In Bitcoin, the miners 104 find a nonce such that a block header hashes, with SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

As an alternative to proof-of-work, the blockchain network 100 may, instead, be a proof-of-stake blockchain network. A proof-of-stake blockchain network provides an alternative mechanism for achieving consensus. In the proof-of-stake blockchain network, the blockchain is secured by proof-of-stake rather than proof-of-work. Under proof-of-stake, the miners deposit a security deposit of digital assets and, the probability of being selected as the node to mine a block is proportional to the quantity of the digital assets provided as a security deposit. Proof-of-stake blockchain systems can be used to avoid the computational expense and energy required to mine on proof-of-work blockchains. Further, proof-of-stake blockchains can allow for higher frequency and more regular block creation than proof-of-work blockchains.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 in the blockchain network may not operate as miners and may, instead, participate as validating nodes. Validation of transactions may involve checking signature(s), confirming reference to valid UTXO, etc.

The example of FIG. 1 includes five nodes 102, two of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group 110 of nodes. In the example illustrated, three nodes 102 are shown as taking part in the group 110. However, the actual number of group 110 members may be much larger.

The group 110 may be an open-membership group which may be joined by any nodes 102 upon submission of sufficient stake to a pool associated with the group 110. For example, a node may join a group through transfer of a token, such as a network resource or a digital asset, to an account (e.g., to a group public address or group-stake public key) associated with the group 110. A node 102 joining a group may be any node in the blockchain network including both mining and non-mining nodes.

The group 110 may be used to cooperatively release an encryption private key corresponding to an encryption public key in response to the occurrence of an event. The event may be, for example, a network-based event (e.g., an event that is observable on the blockchain network, the Internet, or another network). The event may be a real-world event (i.e., an event that initially occurred outside of a network which may, for example, have been reported on so that it is detectable on a network).

Electronic Device Operating as A Node

Figure 2:
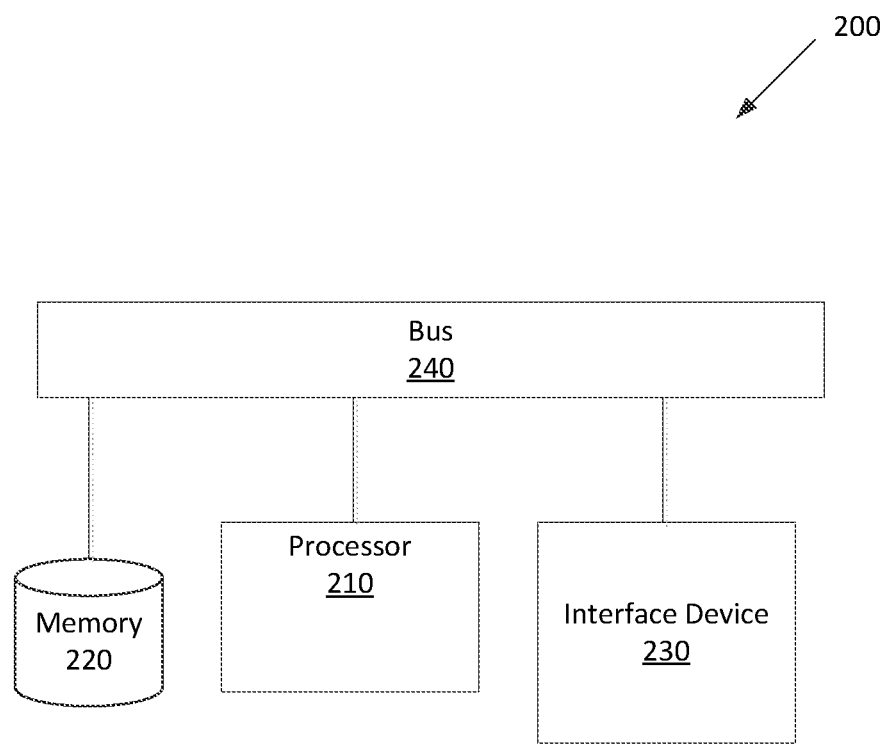
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol. The processor 210 may be central processing unit (CPU), an application specific integrated circuit (ASIC), or a processor of another type.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

The electronic device 200 acts as a node 102 (FIG. 1) in the blockchain network 100 (FIG. 1). Some nodes may join and otherwise take part in a group 110 (FIG. 1). A group 110 is formed when a group of token bearers pool tokens or other digital assets supported by the blockchain network 100 (FIG. 1). The group may, for example, act cooperatively to fulfil a monitoring request. More particularly, the group may be configured to effectively release an encryption private key when an event that is associated with a monitoring request is determined to have occurred. An encryption public key may be used before the occurrence of the event to encrypt data or to encumber one or more tokens. An event lock can, therefore, be provided so that a cryptographic lock is placed on data or tokens to prevent the unlocking of such data or tokens before an event has occurred but to permit unlocking of the data or tokens after the event has occurred.

Some nodes may take part in the blockchain network as members of the group 110. Other nodes may not take part as group members. Such nodes may, instead, function as one or more of miners or validators or may provide other functions associated with the blockchain network.

As will be described in greater detail below, nodes joining a group 110 may act as monitoring nodes and may monitor for the occurrence of an event. When a node determines that an event has occurred, the node releases an encryption private key share related to an encryption public key share. Each of the nodes in the group 110 is associated with a separate encryption private key share and a threshold number of such key shares may be used to re-construct the encryption private key corresponding to the encryption public key. Thus, when a sufficient number of nodes have released their respective encryption private key share, the encryption private key may be obtained.

To maintain the independence of each monitoring node, the monitoring nodes may iteratively provide an indicator to the other monitoring nodes (i.e., to other nodes of the group) at an interval and the indicator may represent one of an encryption private key share or a dummy signal. More particularly, a node may include a dummy signal at each signalling interval until that node determines that an event has occurred. When the event is determined to have occurred, the node may provide an indicator that represents the encryption private key share to the other nodes. The dummy signal may be configured to resemble the encryption private key share in format (e.g., be the same length as the private key share) so that other nodes cannot determine from a single indicator, taken alone, whether that indicator represents a dummy signal or an encryption private key share. However, monitoring nodes may continually attempt to identify whether the encryption private key corresponding to the encryption public key can be determined from indicators. For example, the monitoring nodes may repeatedly select subsets of indicators and may calculate a possible shared secret from that subset of indicators. Then, the monitoring nodes may evaluate the possible shared secret against the encryption public key to determine whether the possible shared secret is, in fact, the encryption private key. That is, a search may be performed based on the indicators provided by the monitoring nodes to identify the encryption private key. When a threshold number of encryption private key shares have been provided, it will be possible to reconstruct the encryption private key due to the threshold scheme used in the generation of the encryption private key shares.

Requesting Event Lock Encryption

Figure 3:
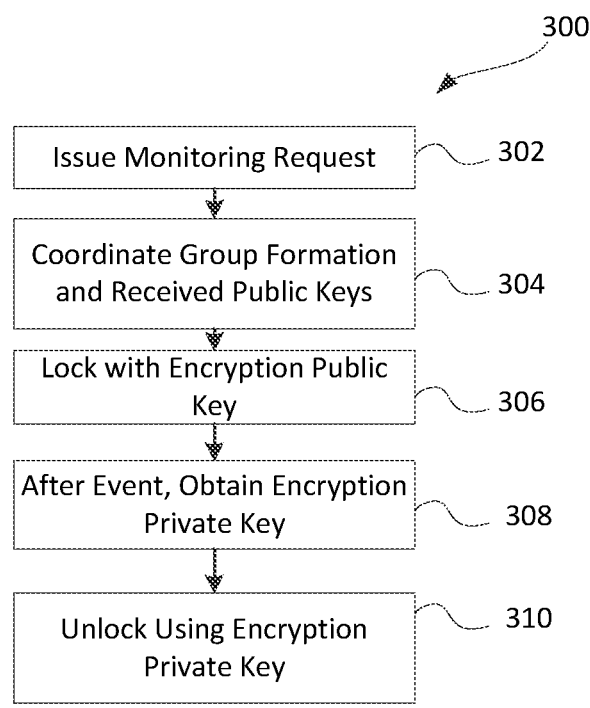
FIG. 3 is a flowchart of an example method for requesting and using event lock encryption.

Referring now to FIG. 3, a method 300 for requesting and using event lock encryption is illustrated. The method 300 may be performed by a requester node (a "requester"), which may be a node 102 of the blockchain network. Such a node 102 may include computer-executable instructions stored in memory 220 (FIG. 2) which implement the method 300. Such instructions, when executed by a processor 210 (FIG. 2), cause a node 102 (such as an electronic device 200 of the type described with reference to FIG. 2) to perform the method 300.

At operation 302, the node 102 issues a monitoring request. The monitoring request is a request for other nodes 102 of the blockchain network to provide event lock encryption. That is, the monitoring request is a request for other nodes 102 to release a private key (which may be referred to as an encryption private key) only after an event has occurred. As will be described in greater detail below, a public key (which may be referred to as an encryption public key) corresponding to that private key is released by the group before the event occurs to allow that public key to be used to encrypt data or encumber a token prior to the event. The monitoring request is, therefore, a request to facilitate the securing of a digital asset or network resource.

The monitoring request may be issued off of the blockchain (i.e., "off chain"). For example, the monitoring request may be issued on a web server accessible via the Internet or on another network server accessible over another network, such as a private network. By way of example, the monitoring request may be stored in an open forum accessible via the Internet.

The monitoring request may include one or more parameters associated with the request. By way of example, the monitoring request may detail an event that is associated with the request and that nodes of a group fulfilling the monitoring request will monitor for. The event may be, for example, a network-based event (e.g., an event that is observable on the blockchain network, the Internet, or another network). The event may be a real-world event (i.e., an event that initially occurred outside of a network which may, for example, have been reported on so that it is detectable on a network). By way of example, the event may be said to occur when a person identified in the monitoring request has passed away. The event can be any type of event, and is specified or predetermined in some way to enable monitoring and/or detection of occurrence of the event. Such an event may be detected, for example, by nodes that are configured to automatically monitor online news sources, social media or obituaries or other types of data sources. The event may be detected by means of an input signal from a source. Other types of events may also be specified.

The monitoring request may also include or be associated with a hash of the event description. The hash may, for example, be an SHA-256 hash of the event description. By way of further example, the monitoring request may specify a quantity of tokens that are offered to a group that fulfils the monitoring request. The tokens may control network resources such as digital assets represented by the tokens. When a token is transferred from one node to another node of a network, such as a blockchain network, control of the network resource is transferred to the recipient node. The monitoring request may, therefore, specify a quantity of network resources (such as digital assets) that are provided by a requesting party for completion of the monitoring request.

As will be described in greater detail below, nodes can become members of a group that is involved in the fulfilment of a monitoring request by transferring one or more tokens to the group. The tokens act as "stake" that may be confiscated by a threshold of other nodes of the group as a penalty for non-conformity with a group protocol. The monitoring request may specify an amount of "stake" that is required to join the group. That is, the monitoring request may specify the stake that is required to join the group and effectively become a "monitoring node", which is a node that undertakes to fulfil the monitoring request by monitoring for the event defined by the monitoring request.

The monitoring request may also define the size of the group. That is, the monitoring request may specify the number of nodes that are to be included in a group. The monitoring request may also define a threshold that is associated with the release of the encryption private key and/or an interval for signalling between nodes of the group. For example, the interval may be an interval that is associated with block generation on an event-chain which is formed between nodes of the group. The monitoring request may also define a threshold for a window of opportunity to submit a signal indicating that an event has occurred. As will be explained in greater detail below, the threshold for the window of opportunity may control a window of time during which an encryption private key share submitted in an indicator will be considered to have been properly or accurately submitted. Encryption private key shares that are shared before or after this window of opportunity may be disregarded by nodes. For example, a node that submitted an encryption private key share before or after the window of opportunity may not be eligible for a share of the network resources that are offered by the requester in exchange for completion of the request. Further, to reduce the size of a search space, encryption private key shares that are submitted before or after the window of opportunity may be excluded during a search for an encryption private key.

Thus, the monitoring request may include various data including any one or a combination of: 1) an event description; 2) a hash of the event description; 3) a quantity of stake required for participation; 4) a size of a group; 5) a threshold associated with a threshold scheme; 6) a signalling interval; 7) a threshold for a window of opportunity; or 8) a quantity of network resources offered for completion of the request.

At operation 304, the requestor may coordinate group formation by a plurality of nodes. More particularly, the requestor may, in response to issuing the monitoring request at operation 302, receive a participation requests from a plurality of nodes in the blockchain network. The participation requests are requests to be added to a group that will undertake to complete the monitoring request. Each participation request may reference network resources, such as tokens or other digital assets, that the node associated with the participation request intends to provide as "stake" to join the group. For example, the participation request may specify a transaction identifier of UTXOs containing their stake.

When valid participation requests have been received from a sufficient number of nodes (e.g., the number of participation request may be determined to be sufficient if the number of participation requests is equal to the size of the group specified in the monitoring request and a participation request may be determined to be valid if references sufficient tokens as "stake"), the nodes that submitted participation requests establish secure communication channels between one another and collectively execute a dealer-free secret sharing protocol twice to generate two shared secrets—an encryption private key and a group-stake private key. Each node holds two private key shares—an encryption private key share and a group-stake private key share. Both of these private key shares are group private key shares in that they represent a share of a private key that is associated with the group 110. The encryption private key and the group-stake private key may, however, be used for different purposes. As will be discussed below, the group-stake private key is associated with a group-stake public key that encumbers tokens or other digital assets of the group. Such tokens may include the "stake" that each member of the group contributes in order to join the group. The encryption private key is associated with an encryption public key and the encryption public key may be used to encrypt data or to encumber a token with an event lock. More particularly, since the nodes of the group cooperate to release the encryption private key after an event has occurred, the encryption public key may be used to encrypt data or encumber tokens or other digital assets to restrict control over such data/tokens until after the event has occurred.

Techniques for obtaining the encryption private key share, the encryption public key, the group-stake private key share and the group-stake public key will be described below with reference to FIG. 4.

During operation 304, the requestor receives the encryption public key and the group-stake public key from one or more nodes of the group (i.e., from one or more of the nodes that submitted valid participation requests and that took part in the generation of the encryption public key and the group-stake public key). The requestor then creates a transaction that includes, as inputs, the tokens or other digital assets referenced in each participation request (i.e., the "stake") and also a token or other digital asset offered by the requestor for completion of the request. The transaction encumbers these tokens or other digital assets with the group-stake public key such that a signature valid for the group-stake public key is required to unlock these tokens. The requestor may sign the transaction to remove a past encumbrance past on the token or other digital asset offered by the requestor for completion of the request and may provide the transaction to the nodes of the group so that each node may add a signature to remove a past encumbrance previously placed on a respective node's "stake."

Optionally, the requestor may include the encryption public key as metadata in the transaction so that, when the transaction is added to the blockchain of a blockchain network, the encryption public key is visible to other nodes of the blockchain network and may be used by such nodes to place an event lock on data or tokens. The requestor may also optionally add the hash of the event description (or another identifier) as metadata to the transaction to associate the transaction with the monitoring request.

The transaction is signed by each node of the group (i.e., by each of the one or more of the nodes that submitted valid participation requests and that took part in the generation of the encryption public key and the group-stake public key) and is then broadcast by one of the nodes to the blockchain network so that it may be added to the blockchain (provided sufficient mining fees are included and provided that the transaction otherwise validates).

At operation 306, the requestor (or another node that obtains the encryption public key) uses the encryption public key to encrypt data or to encumber a token or other digital asset. The token or other digital asset may be encumbered, for example, by placing the encryption public key in a locking script of a transaction that includes the token or other digital asset as input. The locking script locks the token or other digital asset so that the lock may only be removed when a signature that is valid for the encryption public key. For example, the encryption private key may be used to remove the lock (e.g., by generation of a signature using the encryption private key).

The event that was associated with the monitoring request may occur at some time following operation 306 and the requestor may then, at operation 308, obtain the encryption private key from one or more nodes of the group. The encryption private key may be obtained, for example, through the blockchain network. For example, after the group has reconstructed the encryption private key using techniques such as those described below, the encryption private key may be added to a transaction that is broadcast to the blockchain network and added to the blockchain. The requestor (or another node requiring the encryption private key) may monitor the blockchain and obtain the encryption private key from the blockchain.

Then, at operation 310, the requestor (or another party) may use the encryption private key to decrypt data encrypted at operation 306 or to remove an encumbrance placed on tokens or other digital assets. That is, at operation 310 the requestor may use the encryption private key to unlock data or tokens that were locked with the encryption public key at operation 306.

Participating as a Node in a Group

Figure 4:
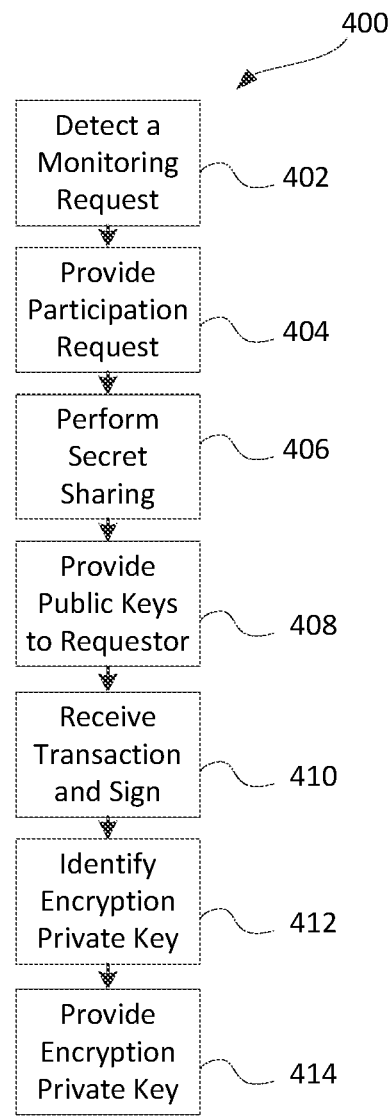
FIG. 4 is a flowchart of an example method for participating as a node in a group in an event lock encryption scheme.

Referring now to FIG. 4, a method 400 for participating as a node in a group in an event lock encryption scheme is illustrated. The method 400 may be performed by a node 102 of the blockchain network. According to the method 400, the node cooperates with other nodes in a group 110. The node may, therefore, be referred to as a group node or member. Such a node 102 may include computer-executable instructions stored in memory 220 (FIG. 2) which implement the method 400. Such instructions, when executed by a processor 210 (FIG. 2), cause a node 102 (such as an electronic device 200 of the type described with reference to FIG. 2) to perform the method 400.

At operation 402, the node 102 detects a monitoring request which may have been issued by a requestor. The monitoring request may be of the type described above with reference to operation 302 of the method 300 of FIG. 3 and it may be detected on a network.

At operation 404, in response to detecting the monitoring request, the node 102 provides a participation request to the requestor that issued the monitoring request. That is, the node 102 transmits a request to join a group that will be tasked with fulfilling the monitoring request. The participation request may be as described above with reference to operation 304 of the method 300 of FIG. 3. For example, the participation request may reference network resources, such as tokens, that the node performing the method 300 intends to provide as "stake" to join the group. For example, the participation request may specify a transaction identifier of UTXOs containing their stake.

At operation 406, the node 102 cooperates with other nodes that also submitted participation requests to obtain private key shares and corresponding public keys. More particularly, the node 102 cooperates with other nodes that submitted participation requests. These nodes, which are the group members, establish secure communication channels with each other (e.g., using a standard public key cryptosystem or Diffie-Hellman key exchange) The nodes then collectively execute a dealer-free secret sharing protocol with a threshold, $C_t$, twice to generate two shared secrets: an encryption private key and a group-stake private key. The threshold, $C_t$, is the number of key shares that are required to reconstruct the private key and to generate a signature that is valid for a public key that corresponds to a respective one of the private keys. The threshold, $C_t$, may be defined by the requestor in the monitoring request.

Accordingly, at operation 406, a cryptographic method (which may be referred to as a private key reconstruction scheme) may be employed which enables the distribution of a single private key among multiple participants, such that a threshold of m-of-n key (where m is the threshold, $C_t$) shares are required to reconstruct the private key. A fewer number of key shares than m cannot generate the private key and cannot generate a signature that is valid for a public key corresponding to the private key.

One cryptographic method that may be used at operation 406 is Shamir's Secret Sharing Scheme (SSSS), which is based on the concept that a polynomial of degree t can be fit to any set of t+1 points. A polynomial f(x) of degree t is formed with the shared private key as the constant term ($a_0$=f(0)) and the remaining coefficients are picked at random. n points on the curve are then given to each node. If m=t+1 or more of the nodes (which may be referred to as participants) then combine their points, there is sufficient information to fit the order t polynomial to these points, and $a_0$ is revealed as the secret. This scheme enables the sharing of a single private key among an arbitrarily large number of parties with any threshold.

The standard SSSS can be extended to remove the requirement of a trusted dealer to create the polynomial and distribute the secret shares (which is a single point of failure and therefore not trustless). In this dealer-free SSSS, each participant $P_i$ generates their own random degree t polynomial $f_i(x)$, and then securely sends $f_i(j)$ to each other participant $P_j$. Each $P_i$ then sums all the received points $f_1(i)+f_2+ \ldots +f_n(i)$ to obtain their secret share $s_i$=f (i) which is the $P_i$ point on the shared polynomial f (x).

After the secret shares have been created, the public key corresponding to the shared private key (which no participant knows) is computed as follows (with Elliptic Curve generator G):

Participants $P_i$, where i=1, . . . t+1, compute their public key shares as $b_i s_i \times G$, where $b_i$ is the Lagrangian interpolation coefficient, which may be determined as:

$$b_i = \prod_{j \in U, j \neq i} \frac{i}{j - i}$$

These public key shares (which may be referred to as group-stake public key shares for public key shares associated with the group-stake private key or encryption public key shares for public key shares associated with the encryption public key) are then broadcast to other nodes of the group and the shared public key A is then calculated as the sum of t+1 shares:

$$A = \sum_{i=1}^{t+1} b_i s_i \times G$$

Each node may independently determine the shared public key from the public key shares.

The cryptographic method described above may be performed twice—once to obtain the encryption private key share and associated encryption public key and again to obtain the group-stake private key share and associated group-stake public key.

Accordingly, at operation 406, the node performing the method 400 cooperates with other nodes to obtain and store an encryption public key and an associated encryption private key share and also to obtain and store a group-stake public key and an associated group-stake private key share. The group-stake private key share allows a subset of nodes of the group controlling at least a threshold of group-stake private key shares to generate a valid signature on behalf of the group while the encryption private key share allows a subset of nodes of the group controlling at least a threshold of encryption private key shares to release an encryption private key when such nodes detect an event.

The node performing the method 400 generates an encryption private key share and a group-stake private key share and each of the nodes of the group is associated with both a respective group-stake private key share and an encryption private key share. The corresponding public keys (i.e., the group-stake public key and the encryption public key) are associated with the group of nodes that performed the dealer-free secret sharing protocol. The private key shares are associated with a private key reconstruction scheme for the group to allow the private key to be determined from at least a threshold, $C_t$, of the private key shares. For example, a group-stake private key share may be generated by executing a dealer-free secret sharing protocol with a threshold (for a threshold signature scheme such as an Elliptic Curve Digital Signature Algorithm (ECDSA) threshold signature scheme) that may be defined in the monitoring request and an encryption private key may be similarly generated based on encryption private key shares.

During operation 406, the node may store the group-stake public key share for each of the other nodes of the group. These public key shares may be used by the node to verify signatures for block signing and commitment signing on an event chain, which will be described below.

At operation 408, the encryption public key and group-stake public key (both of which have been independently verified by the nodes of the group) are provided to the requestor. As noted above with reference to operation 304 of the method 300 of FIG. 3, the requestor then provides a transaction to the nodes of the group for signing. The transaction includes, as inputs, the tokens or other digital assets referenced in each participation request (i.e., the "stake") and also a token or other digital asset offered by the requestor for completion of the request. The transaction encumbers these tokens or other digital assets with the group-stake public key. The requestor may sign the transaction to remove a past encumbrance past on the token or other digital asset offered by the requestor for completion of the request and may provide the transaction to the nodes of the group so that each node may add a signature to remove a past encumbrance previously placed on a respective node's "stake."

At operation 410, the node may receive the transaction and add a signature that removes a past encumbrance on the "stake" referenced in the participation request submitted at operation 404. By adding such a signature, the node effectively encumbers the token or other digital asset provided as stake with the group-stake public key.

After all nodes in the group have added respective signatures to remove a past encumbrance on their "stake", the transaction is broadcast to the blockchain network.

At operation 412, the node then cooperates with other nodes of the group to identify the encryption private key and, when the nodes of the group have successfully identified the encryption private key, at least one of the nodes prepare a transaction and the nodes cooperate to generate a signature for a transaction (at operation 414) that returns the "stake" to nodes that operated in accordance with a monitoring protocol and that distributes a token or other digital asset offered by the requestor for completion of the request to one or more nodes that assisted in completion of the request. The signature is generated using respective group-stake private key shares and at least a threshold of group-stake private key shares must be used to generate a valid signature.

At operation 414, the encryption private key is provided to the requestor. For example, the encryption private key may be included in the transaction as metadata.

Figure 5:
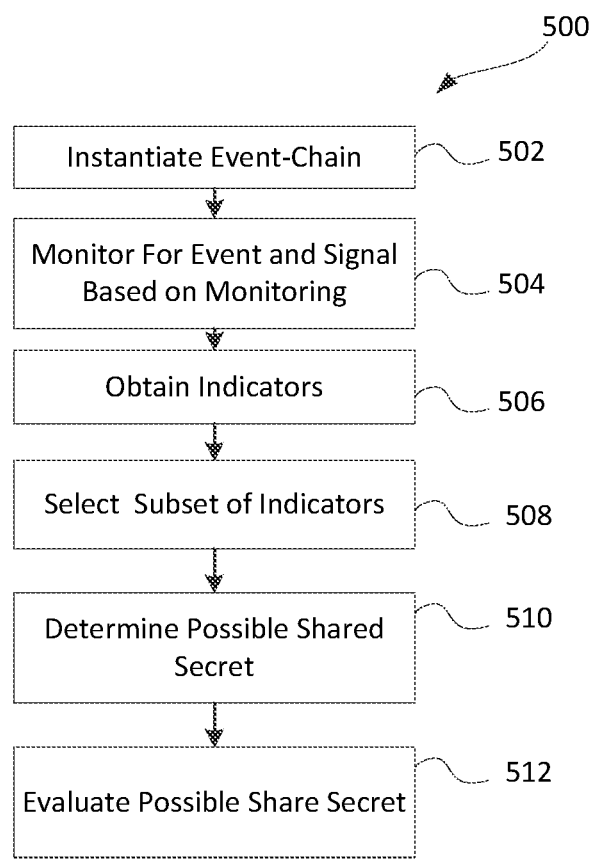
FIG. 5 is a flowchart of an example method of identifying an encryption private key.

Techniques for cooperatively identifying the encryption private key will now be described with reference to FIG. 5, which illustrates a method 500 of identifying an encryption private key. These techniques are performed by a node of the group, in cooperation with other nodes of the group, at operation 412 of the method 400 of FIG. 4. For example, the node performing the method 400 of FIG. 4 may also perform the method 500 of FIG. 5.

At operation 502, an event-chain may be instantiated. An event-chain is a type of temporary blockchain. More specifically, the event-chain is a proof-of-stake blockchain that is mined by the group of nodes with stakes encumbered by the group-stake public key. A proof-of-stake consensus algorithm may be employed and may, for example, be of the type described in Micali, Silvio "Algorand: The efficient and democratic ledger." arXiv preprint arXiv:1607.01341 (2016). The event-chain may have regular block creation times, timestamped blocks and low forking probability. Block rewards for mining blocks on the blockchain may be provided to miners of the event-chain and may be taken as a part of the token or other digital asset offered by the requestor for completion of the request.

The event-chain may be configured, by the nodes of the group, so that blocks are generated at an interval specified by the requestor (for example, in the monitoring request). This interval may be selected to be smaller than the latency the requester desires for the private key release following the event. However, smaller intervals can consume larger resources than larger intervals.

The event-chain may be instantiated with a first block, referred to as a genesis block, which is empty and which is timestamped with an instantiation time to.

The node performing the method 500 may perform a number functions including, for example: 1) monitoring for an event and signalling; and 2) searching for an encryption private key.

At operation 504, the node monitors for the event associated with the monitoring request and signals to other nodes based on the monitoring. By way of example, the node may monitor a network server, such as a web server, for the event. For example, the node may monitor a news website, a social media website, a blogging or microblogging platform, etc. for the event. The node iteratively provides an indicator to a plurality of nodes of the group. That is, the node repeatedly signals to other nodes of the group and the signalling is based on the result of the monitoring. More specifically, the node iteratively provides an indicator to other nodes of the group. The indicator may also be referred to as a commitment. When the predetermined event (i.e., the event specified in the monitoring request) has not occurred, the indicator includes a dummy signal, which is of the same length as the encryption private key share. The dummy signal may be randomly generated by the node and the dummy signal may be different at each iteration. In response to detection of the predetermined event, however, the node provides an indicator that includes the encryption private key share held by the node (this type of indicator may be referred to as the "true signal"). The "true signal" is only provided by a node once so that other nodes cannot infer that the event has determined merely by monitoring for repetition in indicators from a given node.

The indicator may also include the group-stake public key share for the node and it may be signed based on the group-stake private key share held by the node performing the method 500. Thus, when the indicator is provided to the plurality of nodes of the group it includes a signature generated with the group-stake private key.

The node, at operation 504, signals to the other nodes based on the monitoring by providing the indicator in a block on the event chain. Each block is timestamped. Other nodes of the group are also configured to independently perform their own monitoring and signalling operations (similar to operation 504 of the method 500) and may provide a "true signal" when they detect the occurrence of the event. Thus, at operation 506, the node may obtain a plurality of indicators provided by a plurality of other nodes of the group. Each of the indicators represents one of an encryption private key share or a dummy signal. The indicators may be iteratively obtained by the node (e.g., obtained from each block of the event-chain) and the indicators, once obtained, may be analysed to attempt to identify the encryption private key. More particularly, the encryption private key may be identified by iteratively selecting (at operation 508) a subset of the indicators from a current block and/or one or more recent blocks, calculating (at operation 510) a possible shared secret from the subset of indicators, and evaluating (at operation 512) each possible shared secret against the encryption public key to determine whether the possible shared secret is the encryption private key. While not illustrated in FIG. 5, if the encryption possible shared secret is not the encryption private key, then the search may be performed on a different subset of indicators (e.g., all possible subsets of indicators in a search space may be evaluated and the search space may update as new blocks are added to the event-chain). Accordingly, the node may effectively perform a search based on indicators that have been provided in blocks on the event chain. When the number of true signals (i.e., encryption private key shares) provided in indicators is greater than the threshold, $C_t$, for the threshold private key reconstruction scheme, then it is possible to obtain the encryption private key.

The encryption private key may be reconstructed (i.e., obtained from a threshold of encryption private key shares) by performing a search algorithm and SSSS. At operation 508, a shared secret is calculated (with SSSS) for each possible threshold combination of the node's indicators (i.e., the dummy signal or true signal provided by each node) for the previous number of block within a defined window of opportunity. The window of opportunity may be defined in the monitoring request submitted by the requestor. For each potential shared private key, the corresponding public key may be calculated using elliptic curve cryptography. Then, the calculated public key may be compared with the known encryption public key. If the calculated public key corresponds with the encryption public key, then the search may cease and the encryption private key may be reported back to the requestor. However, until the encryption private key is found, the node may continue performing the search based on indicators in new blocks as they are created.

The node performing the method 500 (or another node) may also, optionally, decrypt data previously encrypted with the encryption public key when the possible shared secret is determined to be the encryption key. The node performing the method 500 (or another node) may also, optionally, generate a signature based on the encryption private key and add the signature to an unlocking script of a transaction to unlock a token previously encumbered with the encryption public key. Accordingly, once the encryption private key is identified, it may be used for a number of purposes.

As noted above in the discussion of operation 412 of FIG. 4, when the encryption private key is identified, the event chain may terminate and the tokens previously encumbered by the group-stake public key may be redistributed. At least one of the nodes of the group prepares a transaction and the nodes cooperate to generate a signature for the transaction (at operation 414). For example, the transaction may distribute a token or other digital asset offered by the requestor for completion of the request to one or more nodes that assisted in completion of the request. For example, the nodes may identify nodes of the group that provided an indicator representing an encryption private key share in a defined window of opportunity (which may be defined based on a threshold for a window of opportunity defined in a monitoring request). A plurality of the nodes controlling at least a threshold of group-stake private key shares may then cooperatively generate a valid signature for a transaction to transfer one or more digital assets to one or more of the identified nodes. For example, the tokens or other digital assets offered by the requestor for completion of the request may be equally distributed to the nodes that provided a true signal within the window of opportunity. Alternative methods of distribution may also be employed. For example, the distribution may be weighted to favour the nodes that signalled first within the window of opportunity. This could be done with a linear or exponential function defined by the requestor in the monitoring request.

Figure 6:
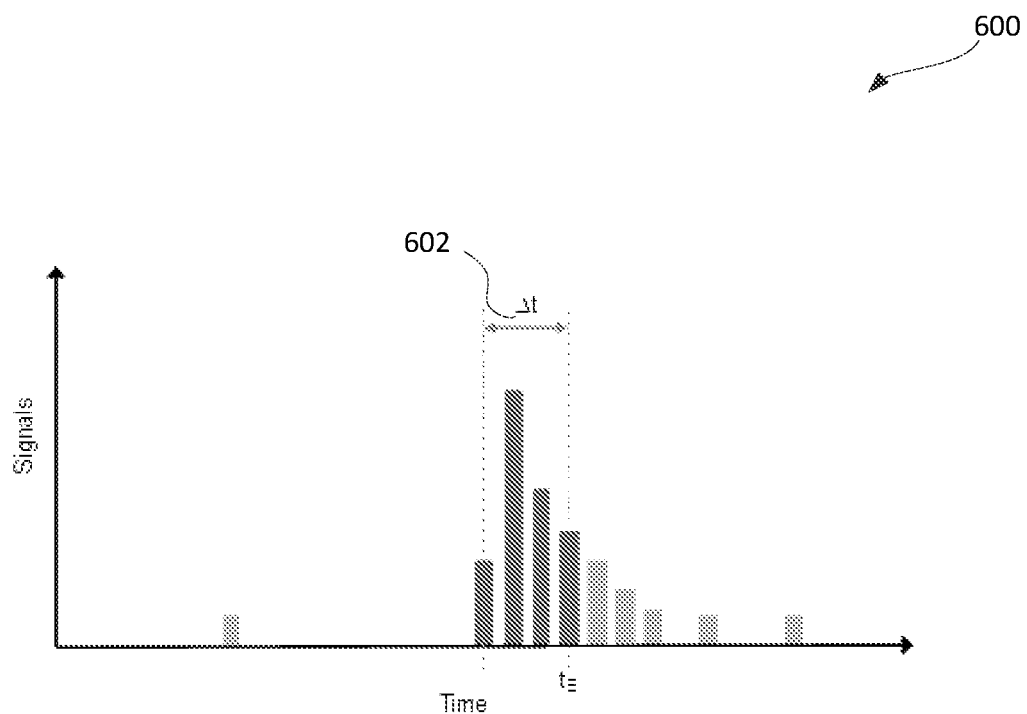
FIG. 6 is an example distribution of true signals in a method of identifying an encryption private key.

Referring now to FIG. 6 an example distribution 600 of "true signals" is illustrated. The distribution shows a window of opportunity 602 having a size defined by a threshold, which may be defined by the requestor in the monitoring request. The nodes that provided true signals within the window of opportunity 602 may receive a share of the tokens or other digital assets provided by the requestor while those nodes that provided a true signal outside of the window of opportunity or did not provide a true signal (or that provided multiple true signals) do not share in such tokens.

To ensure that nodes are appropriately configured in accordance with the monitoring request, the nodes of the group may be configured to monitor nodes that have breached a protocol that is to be used for completion of the monitoring request. For example, a node may determine that one of the nodes of the group has breached a protocol by providing an associated private key share in a plurality of indicators. As noted previously, the protocol may require that each indicator only be provided once. Accordingly, the nodes may be configured to, in response to determining that one of the nodes of the group has breached the protocol, cooperate with other nodes of the group to confiscate the deposit (i.e., the "stake") of the node that breached the protocol.

While the examples described above have referred to operation codes available in Bitcoin, the methods described herein may also be used with other types of blockchain networks.

Further, any references to defined periods of time as described herein may refer to periods of time that are defined based on traditional measures of time (e.g., seconds, minutes, hours, days, etc.) or non-traditional measures of time, such as blocks. For example, since blocks may be created on some blockchain networks with a reasonably consistent frequency, the number of blocks added to the blockchain since a triggering event may provide a measure of time. Thus, any operations in which a node evaluates whether a defined period of time has expired may involve evaluating the number of blocks that have been added to the blockchain.

The methods described above have been generally described as being performed at a node, but features of the method rely on cooperation with other nodes and could be performed elsewhere.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
    storing an encryption public key that is associated with a group of nodes, each node in the group associated with a private key share, the private key shares associated with a threshold private key reconstruction scheme for the group to allow an encryption private key associated with the encryption public key to be determined from at least a threshold of the private key shares;
    iteratively obtaining a plurality of indicators provided by a plurality of nodes of the group, wherein each node is configured to generate at least one of the plurality of indicators, each of the indicators representing one of an encryption private key share or a dummy signal wherein when a predetermined event has not occurred, the indicator is a dummy signal and in response to detecting the predetermined event, the indicator is an encryption private key share; and
    identifying the encryption private key by iteratively:
        selecting a subset of the indicators;
        calculating a possible shared secret based on the subset of the indicators; and
        evaluating each possible shared secret against the encryption public key to determine whether the possible shared secret is the encryption private key.

2. The computer-implemented method of claim 1, further comprising:
    when the possible shared secret is determined to be the encryption private key, decrypting data previously encrypted with the encryption public key.

3. The computer-implemented method of claim 1, further comprising:
    when the possible shared secret is determined to be the encryption private key:
        generating a signature based on the encryption private key; and
        adding the signature to an unlocking script of a transaction to unlock a token previously encumbered with the encryption public key.

4. The computer-implemented method of claim 1, further comprising:
    identifying nodes of the group that provided an indicator representing an encryption private key share in a defined window of opportunity; and
    cooperatively generating a valid signature for a transaction to transfer one or more digital assets to one or more of the identified nodes.

5. The computer-implemented method of claim 4, wherein cooperatively generating a valid signature for a transaction to transfer one or more digital assets to one or more of the identified nodes comprises cooperatively generating a valid signature to distribute one or more tokens provided by a requestor that issued a monitoring request associated with an event.

6. The computer-implemented method of claim 1, wherein the dummy signal is of the same length as the private key share.

7. The computer-implemented method of claim 6, further comprising randomly generating the dummy signal.

8. The computer-implemented method of claim 1, further comprising:
    generating a group-stake private key share and, in cooperation with other nodes of the group, generating a group-stake public key, the group-stake private key share allowing a subset of nodes of the group controlling at least a threshold of group-stake private key shares to generate a valid signature on behalf of the group using a group-stake private key; and
    encumbering a token using the group-stake public key.

9. The computer-implemented method of claim 8, wherein the indicator provided to the plurality of nodes of the group includes a signature generated with the group-stake private key.

10. The computer-implemented method of claim 8, further comprising:
    detecting a monitoring request; and
    in response to detecting the monitoring request, transmitting a request to join the group and establishing secure a communication channel with other nodes of the group.

11. The computer-implemented method of claim 8, wherein the group-stake private key share is generated by executing a dealer-free secret sharing protocol with a threshold for a threshold signature scheme, the threshold defined in a monitoring request.

12. The computer-implemented method of claim 1, further comprising:
    determining that one of the nodes of the group has breached a protocol by providing an associated private key share in a plurality of indicators; and
    in response to determining that one of the nodes of the group has breached the protocol, cooperating with other nodes of the group to confiscate a stake of that one of the nodes of the group.

13. A computer readable storage medium comprising computer-executable instructions which, when executed, configure a processor to perform the method of claim 1.

14. An electronic device comprising:
an interface device;
a processor coupled to the interface device; and
a memory coupled to the processor, the memory having stored thereon computer executable instructions which, when executed, configure the processor to perform the method of claim 1.

\* \* \* \* \*